United States Patent
Sahadeo et al.

(10) Patent No.: US 9,410,980 B2
(45) Date of Patent: Aug. 9, 2016

(54) WORK MONITORING SYSTEM

(71) Applicant: Toyota Motor Engineering & Manufacturing North America, Inc, Erlanger, KY (US)

(72) Inventors: Rick V. Sahadeo, Waterloo (CA); Gary Lee, Cambridge (CA); Ajanthan Subramaniam, Markham (CA); Joel V. Jacob, Waterloo (CA); Yang Lin, Nepean, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 205 days.

(21) Appl. No.: 13/771,576

(22) Filed: Feb. 20, 2013

(65) Prior Publication Data
US 2014/0232828 A1  Aug. 21, 2014

(51) Int. Cl.
*G01P 13/00* (2006.01)
*G06K 9/00* (2006.01)
*B62D 65/18* (2006.01)
*B25J 11/00* (2006.01)

(52) U.S. Cl.
CPC ...................................... *G01P 13/00* (2013.01)

(58) Field of Classification Search
CPC .......... H04N 5/225; G06K 9/00; A63F 13/00; B25J 11/00; B62D 65/18
See application file for complete search history.

(56) References Cited

U.S. PATENT DOCUMENTS

| | | | |
|---|---|---|---|
| 4,909,869 A * | 3/1990 | Sakamoto | B62D 65/06 156/108 |
| 5,734,742 A | 3/1998 | Asaeda et al. | |
| 7,313,270 B2 | 12/2007 | Sones | |
| 7,652,582 B2 | 1/2010 | Littell | |
| 7,756,293 B2 | 7/2010 | Kuwabara et al. | |
| 8,111,239 B2 | 2/2012 | Pryor et al. | |
| 8,213,680 B2 | 7/2012 | Fitzgibbon et al. | |
| 8,267,781 B2 | 9/2012 | Geiss | |
| 8,295,549 B2 | 10/2012 | Marks et al. | |
| 2010/0199228 A1 | 8/2010 | Latta et al. | |
| 2010/0303337 A1* | 12/2010 | Wallack et al. | 382/154 |
| 2011/0050878 A1 | 3/2011 | Wells et al. | |
| 2011/0308075 A1* | 12/2011 | Tohyama | B62D 65/18 29/795 |

OTHER PUBLICATIONS

Screenshot of "Raving Rabbids TV Party" Wii video game; printed from http://wii.gamespy.com/wii/rayman-4/747571p2.html on Jan. 10, 2012 in 1 page.

* cited by examiner

*Primary Examiner* — Sath V Perungavoor
*Assistant Examiner* — Patricia I Young
(74) *Attorney, Agent, or Firm* — Christopher G. Darrow; Darrow Mustafa PC

(57) ABSTRACT

A system and methods for monitoring work processes. Once example computer-implemented method includes recording a three-dimensional work trajectory. The work trajectory comprises a representation of the actual motion of one or more markers. The method further includes comparing the work trajectory to a work template. The work template comprises a representation of the desired motion of the one or more markers. The method further includes sending a success indication to a display when the work trajectory is similar to the work template and sending a failure indication to the display when the work trajectory is dissimilar to the work template.

13 Claims, 4 Drawing Sheets

WORK MONITORING SYSTEM

BACKGROUND

Though many build processes have been automated, the assembly process for automotive vehicles still includes a variety of manual sequences, or work processes, to be performed by assembly plant workers. These work processes can be performed by workers while the vehicle travels along a moving assembly line. Some work processes can be reviewed for accurate completion using quality control mechanisms. Example quality control mechanisms include visual inspections for fit and finish, electronic circuit testing, dynamometer testing for powertrain systems, and road testing to detect unwanted buzzes, squeaks, and rattles. However, some work processes include actions that cannot be easily monitored using traditional quality control mechanisms.

SUMMARY

A system and methods for monitoring the quality of work processes during the vehicle manufacturing process.

In one implementation, a work-process monitoring system is disclosed. The system includes two or more cameras; a display; one or more markers; and a computing device. The computing device includes one or more processors for controlling the operations of the computing device and a memory for storing data and program instructions used by the one or more processors. The one or more processors are configured to execute instructions stored in the memory to: record a three-dimensional work trajectory, using the two or more cameras, wherein the work trajectory comprises a representation of the actual motion of the one or more markers; compare the work trajectory to a work template wherein the work template comprises a representation of the desired motion of the one or more markers; send a success indication to the display when the work trajectory is similar to the work template; and send a failure indication to the display when the work trajectory is dissimilar to the work template.

In another implementation, a computer-implemented method for monitoring work processes is disclosed. The method includes recording a three-dimensional work trajectory wherein the work trajectory comprises a representation of the actual motion of one or more markers; comparing the work trajectory to a work template wherein the work template comprises a representation of the desired motion of the one or more markers; sending a success indication to a display when the work trajectory is similar to the work template; and sending a failure indication to the display when the work trajectory is dissimilar to the work template.

In another implementation, a computing device is disclosed. The computing device includes one or more processors for controlling the operations of the computing device and a memory for storing data and program instructions used by the one or more processors. The one or more processors are configured to execute instructions stored in the memory to: record a three-dimensional work trajectory wherein the work trajectory comprises a representation of the actual motion of one or more markers; compare the work trajectory to a work template wherein the work template comprises a representation of the desired motion of the one or more markers; send a success indication to a display when the work trajectory is similar to the work template; and send a failure indication to the display when the work trajectory is dissimilar to the work template.

BRIEF DESCRIPTION OF THE DRAWINGS

The description herein makes reference to the accompanying drawings wherein like reference numerals refer to like parts throughout the several views, and wherein.

DETAILED DESCRIPTION

A work-processes monitoring system and methods for implementing the system are described below. The monitoring system can include two or more cameras and a display in communication with a computing device. The computing device can include a processor and a memory for storing data and program instructions used by the processor. The processor can execute instructions to record, using the cameras, a three-dimensional work trajectory based on the actual motion of one or more markers disposed on a work tool or a worker performing a work process. The processor can be configured to compare the work trajectory recorded to a work template stored in the memory that represents the desired motion path of the markers. The processor can also be configured to send a success indication to the display when the work trajectory is sufficiently similar to the work template and a failure indication to the display when the work trajectory is sufficiently dissimilar to the work template. Similarity can be based on a threshold amount matched or mismatched between the work template and work trajectory.

Figure 1:
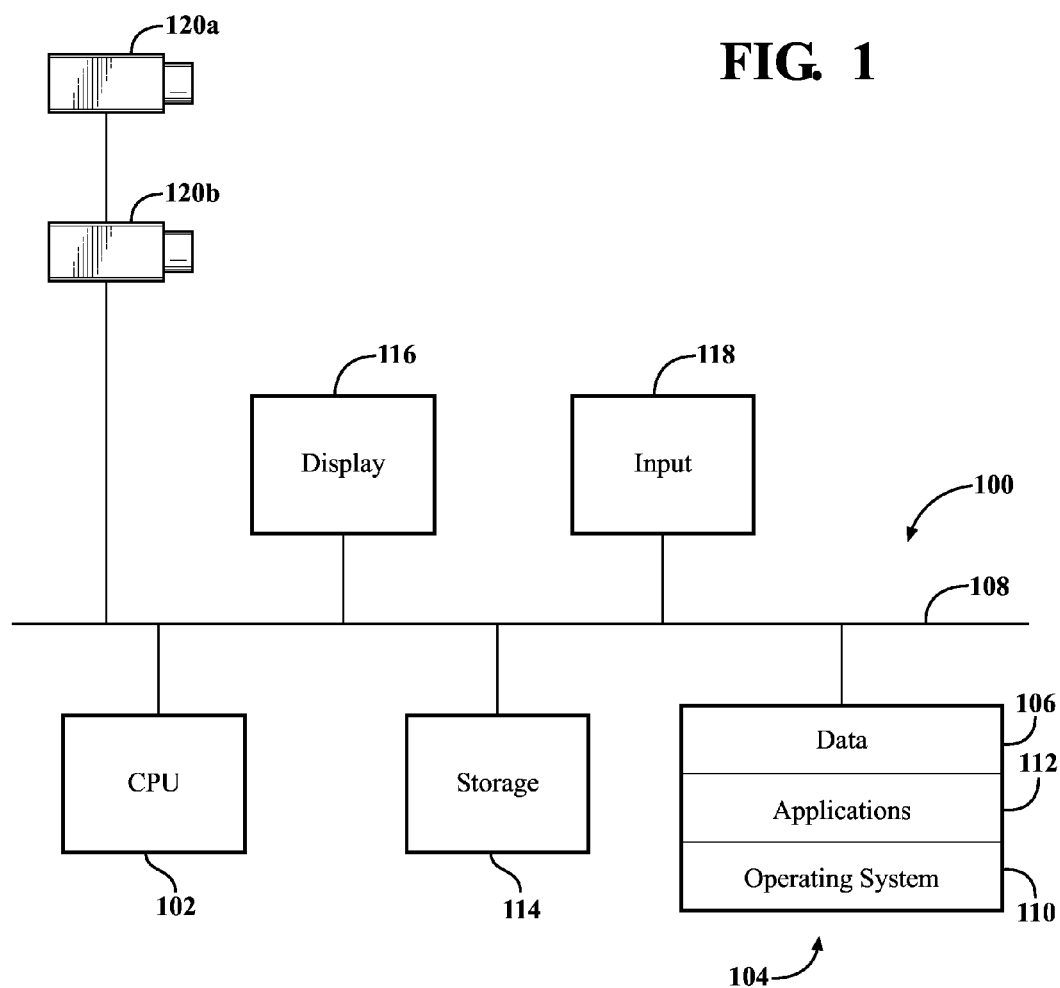
FIG. 1 is a block diagram of a computing device.

FIG. 1 is a block diagram of a computing device 100. The computing device 100 can be any type of handheld, desktop, or other form of single computing device, or can be composed of multiple computing devices. The CPU 102 in the computing device 100 can be a conventional central processing unit or any other type of device, or multiple devices, capable of manipulating or processing information. The memory 104 in the computing device 100 can be a random access memory device (RAM) or any other suitable type of storage device. The memory 104 can include data 106 that is accessed by the CPU 102 using a bus 108. The memory 104 can also include an operating system 110 and installed applications 112, the installed applications 112 including programs that permit the CPU 102 to perform the work-process monitoring methods described here.

The computing device 100 can also include additional storage 114, for example, a memory card, flash drive, or any other form of computer readable medium. The installed applications 112 can be stored in whole or in part in the secondary storage 114 and loaded into the memory 104 as needed for processing. The computing device 100 can include one or more output devices, such as display 116. The display 116 can be any type allowing output to be presented to a user. The computing device 100 can also include an input 118 for receiving user inputs and outputting signals or data indicative of the user inputs to the CPU 102. The input 118 can be any type of device or mechanism accepting user inputs. The computing device 100 can include, or be coupled to, one or more recording devices, such as cameras 120*a,b*. The cameras 120a,b can be any type capable of capturing images and outputting signals or data indicative of those images to the CPU 102.

Figure 2:
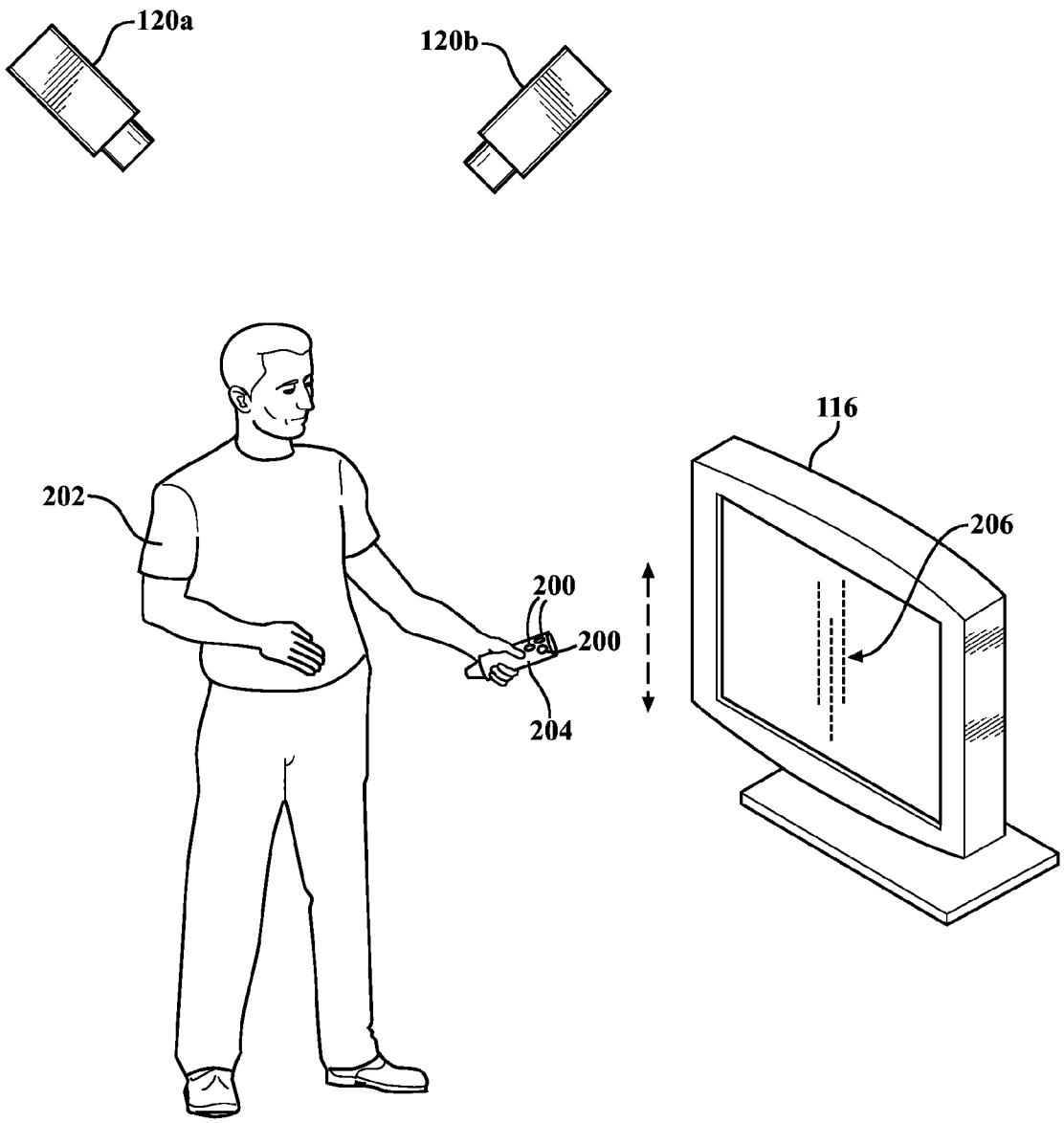
FIG. 2 shows an example implementation of a work monitoring system.

FIG. 2 shows an example implementation of a work monitoring system. The work monitoring system can include two or more cameras 120a,b and a display 116 in communication with a computing device, such as the computing device 100 shown in FIG. 1. The cameras 120a,b can be designed to capture the image of one or more markers 200 for further processing by the computing device 100. A worker 202 can be positioned in the target area of the cameras 120a,b and can grasp a work tool 204 in order to perform a work process. In this example, the markers 200 can be disposed on the work tool 204. Alternatively, the worker 202 can be positioned within the range of the cameras 120a,b to perform a work process without any tools, and the markers 200 can be disposed directly on the worker 202.

In one example, the cameras 120a,b can be infrared cameras and the markers 200 can be infrared markers. In the infrared example, the markers 200 can be the sole visible objects in a recording captured by the cameras 120a,b. If the markers 200 are disposed on the work tool 204, the worker 202 can move the work tool 204 to perform a work process, and the cameras 120a,b can record the changing position of the markers 200 during the work process. The recording can be sent to the computing device 100 and subsequently processed such that a representation of the position of the markers 200 can be sent to the display 116 in order to provide feedback to the worker 202 about the work trajectory travelled by the markers 200. An example work trajectory 206 is shown on the display 116 representing the work path travelled by the markers 200 when the worker 202 shakes his hand up and down a couple of times while holding the work tool 204. This type of visual feedback can assist the worker 202 in monitoring the accuracy of his work processes.

Figure 3A:
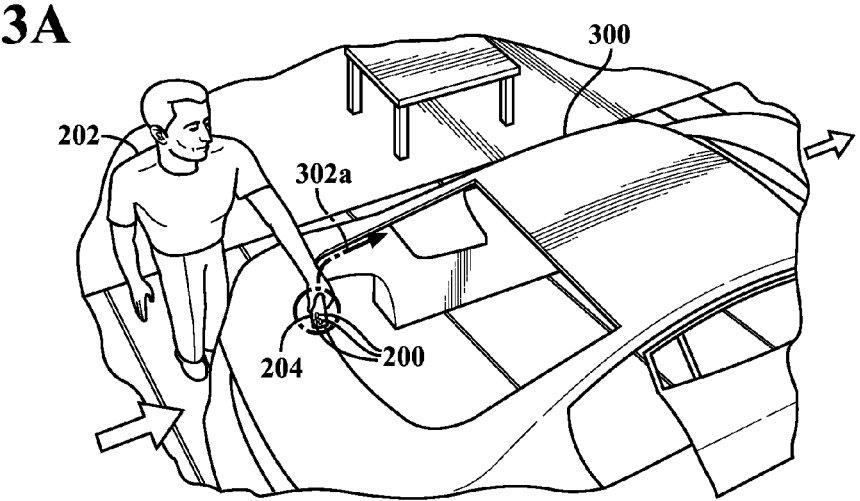
FIGS. 3A-3C show another example implementation of the work monitoring system of FIG. 2.
Figure 3B:
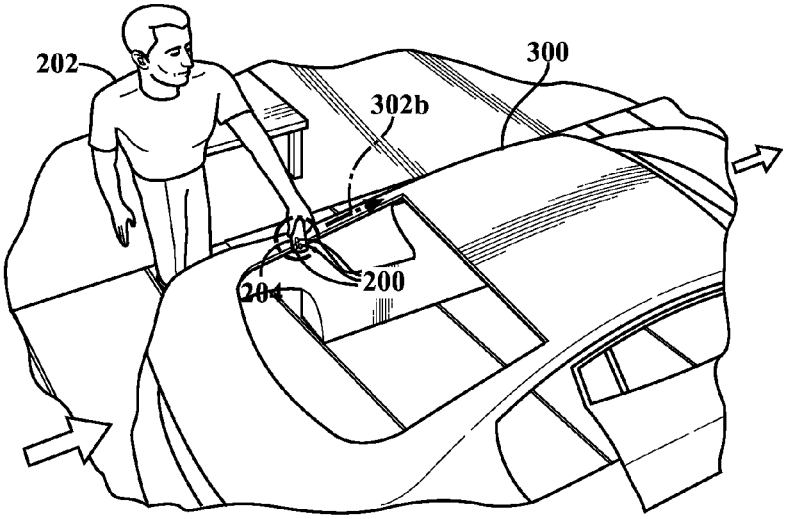
Figure 3C:
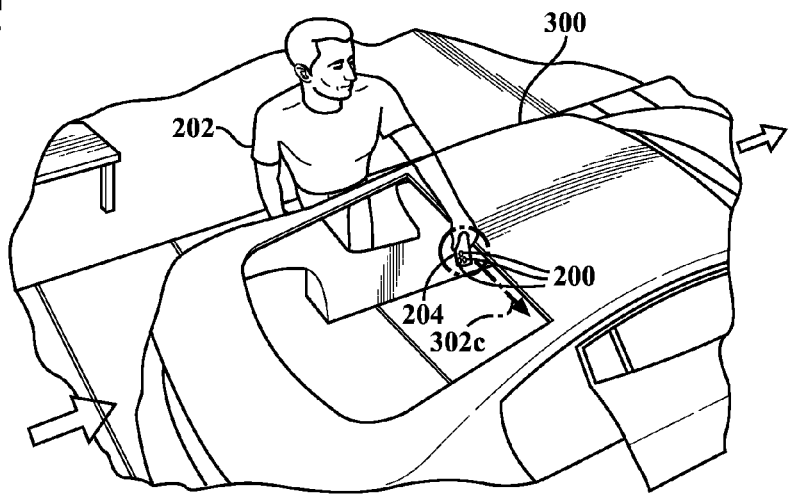

FIGS. 3A-3C show another example implementation of the work monitoring system of FIG. 2. In each of FIGS. 3A-3C, the worker 202 is holding a work tool 204 with markers 200 disposed on the upper end of the work tool 204. The markers 200 are in the field of view of two or more cameras (not shown here) such that the cameras can capture the three-dimensional movement of the markers 200. The worker 202 is performing a work process on a work surface, in this case, a work process involving the rear window from of a vehicle 300. The work surface, e.g. the vehicle 300, can be in continuous motion during the work process. The work surface can also be in discontinuous motion during the work process, that is, the vehicle 300 can stop and start its motion within the work station, as would occur when a vehicle carrier moves along an assembly line.

In the example of FIGS. 3A-3C, the work process being performed by the worker 202 is the application of alcohol or another surface cleaner to a sheet metal flange of the rear window opening of the vehicle 300. The work tool 204 is the bottle of alcohol or other cleaner. The work trajectory 302a-c is represented in three parts, 302a, 302b, and 302c each indicating a section of the path that the work tool 204 must travel in order to successfully complete the work process. FIG. 3A shows work trajectory 302A at the beginning of the path. FIG. 3B shows the work trajectory 302b at the middle of the path. FIG. 3C shows the work trajectory 302c at the end of the work path. Since alcohol or other cleaners can be invisible to the human eye or regular cameras, recording the work trajectory 302a-c, that is, the three dimensional path travelled by the markers 200 during a work process, allows the work monitoring system to verify both the completion and accuracy of the work process.

Figure 4:
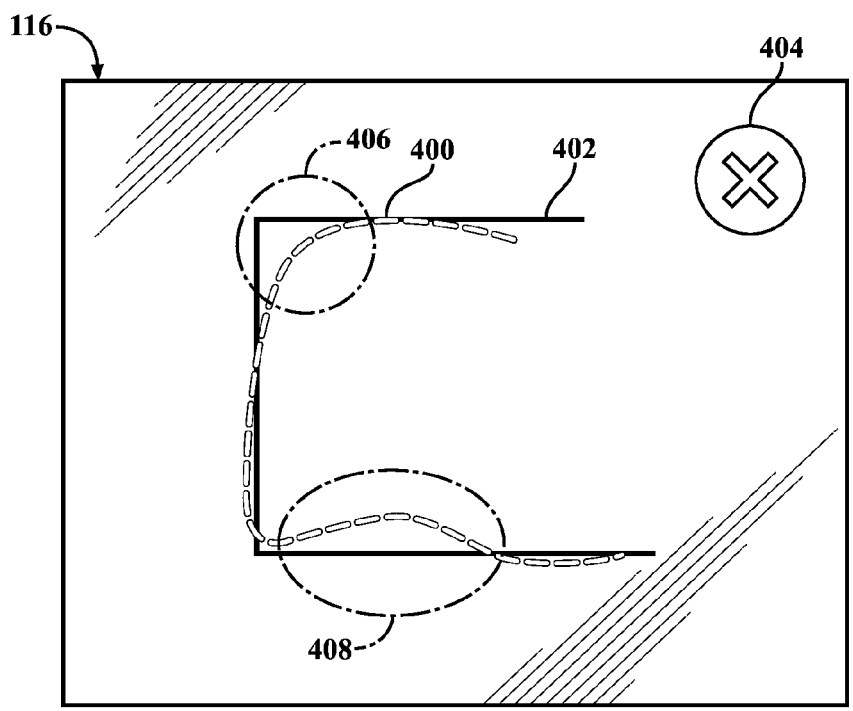
FIG. 4 shows a comparison between an example work trajectory captured by the work monitoring system of FIGS. 3A-3C and an example work template.

FIG. 4 shows a comparison between an example work trajectory 400 captured by the work monitoring system of FIGS. 3A-3C and an example work template 402. The computing device 100 of FIG. 1 can include a CPU 102 for controlling the operations of the computing device 100 and a memory 104 for storing data 106 and program instructions used by the CPU 102. The CPU 102 can be configured to execute instructions stored in the memory 104 to record a three-dimensional work trajectory, such as work trajectory 400, using the two or more cameras 120a,b. The work trajectory 400 can represent the actual motion of the one or more markers 200 disposed on the work tool 204 as the work tool 204 is moved by a worker 202 during a work process, such as the work process shown in FIGS. 3A-3C. The work trajectory 400 can also represent the actual motion of the one or more markers 200 disposed directly on the worker 202 as the worker 202 performs a work process.

The CPU 102 can be further configured to compare the recorded work trajectory 400 to a work template 402. The work template 402 can be a two-dimensional representation of the desired motion of the one or more markers 200 during the work process. The desired motion is such as required for the work process be successfully completed. The work template 402 can be displayed to the worker 202 on the display 116 while the worker 202 completes a work process. The work template 402 can be designed to account for both the motion of the work surface, such as the vehicle 300 shown in FIGS. 3A-3C moving along an assembly line, and the motion of the markers 200 as they travel during a work process. A two-dimensional representation of the work trajectory 400 can also be displayed to the worker 202 on the display 116 while the worker 202 completes a work process. The work trajectory 400 can be superimposed on the work template 402 such that the worker 202 can make a visual comparison between the work trajectory 400 and work template 402. The worker 202 can also receive a failure indication if the work trajectory 400 is dissimilar to the work template 402.

The failure indication sent to the display 116 can be any visual symbol, such as symbol 404 shown in FIG. 4, or audible sound meant to indicate to the worker 202 that the work trajectory 400 is dissimilar to the work template 402. The work trajectory 400 is considered dissimilar to the work template 402 when less than a threshold portion of the work trajectory 400 matches the work template 402. The threshold can be set by the designers of the work process, and can vary depending on the type of work process being undertaken. In the example shown in FIG. 4, area 406 and area 408 are circled to indicate that the work trajectory 400 does not match the work template 402 in these locations. The amount of mismatch, in this case approximately one-third of the total path traveled during the work process, is considered by the designers of the work process and work template 402 to be more than the amount allowable for success, so the symbol 404 can be displayed to the worker 202 to indicate that the work process must be repeated.

Figure 5:
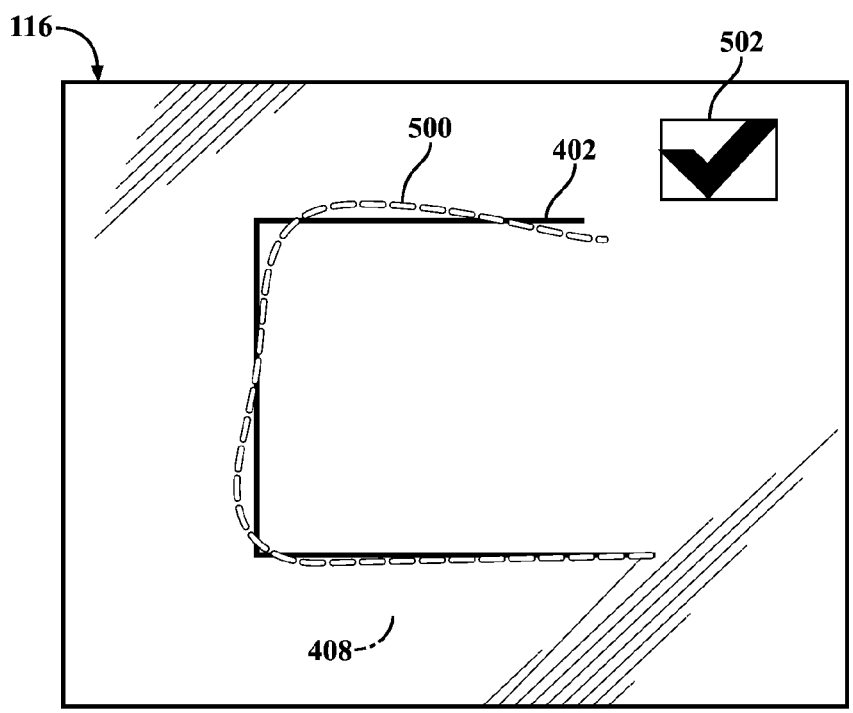
FIG. 5 shows a comparison between another example work trajectory captured by the work monitoring system of FIGS. 3A-3C and the example work template of FIG. 4.

FIG. 5 shows a comparison between another example work trajectory 500 captured by the work monitoring system of FIGS. 3A-3C and the example work template 402 of FIG. 4. As in FIG. 4, the work trajectory 500 is superimposed on the work template 402 on the display 116. In this example, the worker 202 can receive a success indication when the work trajectory 500 is similar to the work template 402. The success indication sent to the display 116 can be any visual symbol, such as symbol 502 shown in FIG. 5, or audible sound meant to indicate to the worker 202 that the work trajectory 500 is similar to the work template 402.

The work trajectory 500 is considered similar to the work template 402 when more than a threshold portion of the work trajectory 500 matches the work template 402. Again, the threshold can be set by the designers of the work process, and can vary depending on the type of work process being undertaken. In the example shown in FIG. 5, there are only small portions of the work trajectory 500 that do not coincide with the work template 402. The amount of mismatch is considered by the designers of the work process and the work template 402 to be small enough that the work process is still successful, so the symbol 502 can be displayed to the worker 202 to indicate that the work process was successful.

Because the work surface can be in either continuous or discontinuous motion during the work process, the work template 402 can be designed such that it is updated to compensate for discontinuous motion. For example, a work surface such as the vehicle 300 shown in FIGS. 3A-3C can stop and start while traveling down an assembly line while the worker 202 is attempting to complete a work process. This stopping and starting will affect the desired travel path of the markers 200 and the overall design needed for the work template 402 will need to account for the stopping and starting motion of the work surface. The work-process monitoring system can be designed to update the template 402 as discontinuities in the motion of the work surface are recognized.

One example method for monitoring work processes using the system described in FIGS. 1-5 above can include recording a three-dimensional work trajectory, such as work trajectory 400 or work trajectory 500. The work trajectory can be a representation of the actual motion of one or more markers, such as markers 200. The work trajectory can be processed for representation on a display, such as display 116, to a worker performing a work process, such as worker 202. The method can also include comparing the work trajectory to a work template, such as work template 402. The work template can be a representation of the desired motion of the one or more markers, that is, a representation indicating a successful work process.

The method can also include sending a success indication to a display, such as display 116, when the work trajectory is similar to the work template. An example success indication is a check mark indicating to a worker that the work process was performed successfully, such as symbol 502 in FIG. 5. The method can also include sending a failure indication to the display when the work trajectory is dissimilar to the work template. An example failure indication is an x mark indicating to a worker that the work process was not performed successfully, such as symbol 404 in FIG. 4. The work trajectory can be determined to be similar to the work template when more than a threshold portion matches the work template and dissimilar to the work template when less than a threshold portion matches the work template.

In the example method, the markers can be disposed on a worker performing a work process on a work surface or on a work tool performing a work process on a work surface. The work tool can be controlled by a worker, such as work tool 204 in FIG. 2 controlled by worker 202, or can be controlled by other means. The work surface can be stationary, in continuous motion, or in discontinuous motion during the work process. For example, the vehicle 300 shown in FIGS. 3A-3C can stop and start along the path of an assembly line, making it necessary to update the work template to compensate for the discontinuous motion.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A work-process monitoring system for a vehicle manufacturing process, the work-process monitoring system comprising:
   two or more cameras;
   a display;
   one or more markers; and
   a computing device, comprising:
      one or more processors for controlling the operations of the computing device; and
      a memory for storing data and program instructions used by the one or more processors, wherein the one or more processors are configured to execute instructions stored in the memory to:
         record a three-dimensional work trajectory, using the two or more cameras, wherein the work trajectory comprises a representation of the actual three-dimensional motion of the one or more markers during a work process performed on a work surface of a vehicle, the work surface of the vehicle traveling along an assembly line while a worker is completing the work process, the assembly line being in a stopping and starting discontinuous motion during the work process;
         create a work template comprising a representation of the desired motion of the one or more markers during the work process performed on the work surface, the work template being updated to compensate for the discontinuous motion of the work surface;
         compare the work trajectory to the updated work template;
         send a success indication to the display when the work trajectory is similar to the work template; and
         send a failure indication to the display when the work trajectory is dissimilar to the work template.

2. The system of claim 1 wherein the cameras are infrared cameras and the markers are infrared markers.

3. The system of claim 1 wherein the one or more markers are disposed on the worker performing the work process on the work surface.

4. The system of claim 1 wherein the one or more markers are disposed on a work tool performing the work process on the work surface.

5. The system of claim 1 wherein the work trajectory is similar to the work template when more than a threshold portion of the work trajectory matches the work template.

6. The system of claim 1 wherein the work trajectory is dissimilar to the work template when less than a threshold portion of the work trajectory matches the work template.

7. A computer-implemented method for monitoring work processes during a vehicle manufacturing process, the computer-implemented method comprising:
   recording, using two or more cameras, a three-dimensional work trajectory wherein the work trajectory comprises a representation of the actual three-dimensional motion of one or more markers during a work process performed on a work surface of a vehicle, the work surface of the vehicle traveling along an assembly line in a stopping and starting discontinuous motion while a worker is completing the work process;

creating a work template comprising a representation of the desired motion of the one or more markers, the work template being updated to compensate for the discontinuous motion of the work surface;

comparing the work trajectory to the updated work template;

sending a success indication to a display when the work trajectory is similar to the work template; and sending a failure indication to the display when the work trajectory is dissimilar to the work template.

8. The method of claim 7 wherein the one or more markers are disposed on the worker performing the work process on the work surface.

9. The method of claim 7 wherein the one or more markers are disposed on a work tool performing the work process on the work surface.

10. The method of claim 7 wherein the work trajectory is similar to the work template when more than a threshold portion of the work trajectory matches the work template.

11. The method of claim 7 wherein the work trajectory is dissimilar to the work template when less than a threshold portion of the work trajectory matches the work template.

12. A computing device, comprising:

one or more processors for controlling the operations of the computing device; and a memory for storing data and program instructions used by the one or more processors, wherein the one or more processors are configured to execute instructions stored in the memory to:

record, using two or more cameras, a three-dimensional work trajectory wherein the work trajectory comprises a representation of the actual three-dimensional motion of one or more markers during a work process performed on a work surface of a vehicle, the work surface of the vehicle traveling along an assembly line while a worker is completing the work process, the assembly line being in a stopping and starting discontinuous motion during the work process;

create a work template comprising a representation of the desired motion of the one or more markers during a work process performed on the work surface, the work template being updated to compensate for the discontinuous motion of the work surface;

compare the work trajectory to the updated work template;

send a success indication to a display when the work trajectory is similar to the work template; and send a failure indication to the display when the work trajectory is dissimilar to the work template.

13. The computing device of claim 12 wherein the one or more markers are disposed on a work tool performing the work process on the work surface.

* * * * *